(12) United States Patent
Judson (10) Patent No.: US 10,997,287 B2
(45) Date of Patent: May 4, 2021

(54) REAL-TIME MONITORING AND ALERTING FOR DIRECTORY OBJECT UPDATE PROCESSING

(71) Applicant: Micro Focus Software Inc., Wilmington, DE (US)

(72) Inventor: Paul Robert Judson, Sugar Land, TX (US)

(73) Assignee: Micro Focus Software Inc., Wilmington, DE (US)

( * ) Notice: Subject to any disclaimer, the term of this patent is extended or adjusted under 35 U.S.C. 154(b) by 226 days.

(21) Appl. No.: 15/726,212

(22) Filed: Oct. 5, 2017

(65) Prior Publication Data
US 2019/0108331 A1 Apr. 11, 2019

(51) Int. Cl.
| | |
|---|---|
| G06F 16/00 | (2019.01) |
| G06F 21/55 | (2013.01) |
| G06Q 20/40 | (2012.01) |
| G06F 11/36 | (2006.01) |
| G06F 11/30 | (2006.01) |
| G06F 8/70 | (2018.01) |

(52) U.S. Cl.
CPC .......... *G06F 21/552* (2013.01); *G06F 11/302* (2013.01); *G06F 11/3612* (2013.01); *G06F 21/554* (2013.01); *G06Q 20/40* (2013.01); *G06F 8/70* (2013.01); *G06F 11/3692* (2013.01)

(58) Field of Classification Search
CPC .... G06F 21/554; G06F 21/552; G06F 11/302; G06F 11/3612; G06F 11/3692; G06F 8/70; G06F 11/3055; G06F 2201/86; G06F 11/006; G06Q 20/40

USPC ......................................................... 707/962
See application file for complete search history.

(56) References Cited

U.S. PATENT DOCUMENTS

| | | | |
|---|---|---|---|
| 5,983,234 A * | 11/1999 | Tietjen | ...................... G06F 8/70 |
| 6,523,027 B1 * | 2/2003 | Underwood | ............ G06F 9/465 |
| 6,643,654 B1 * | 11/2003 | Patel | ....................... G06F 16/10 |
| 7,673,147 B2 * | 3/2010 | Moghe | ................ H04L 63/1416 |
| | | | 713/182 |
| 7,979,494 B1 * | 7/2011 | Golovin | .................. H04L 51/34 |
| | | | 709/206 |
| 8,775,389 B2 | 7/2014 | Arcushin et al. | |
| 9,087,120 B2 | 7/2015 | Hahn et al. | |

(Continued)

OTHER PUBLICATIONS

"Active Directory auditing made easy", Lepide, [Online]. Retrieved from the Internet: <URL: https://www.lepide.com/lepideauditor/active-directory-auditing.html>, (Accessed on Oct. 5, 2017), 7 pgs.

(Continued)

*Primary Examiner* — Shiow-Jy Fan
(74) *Attorney, Agent, or Firm* — Schwegman Lundberg & Woessner, P.A.

(57) ABSTRACT

An update change request that is made against attributes of a directory object causes automatically collection of customized information for an initiator of the request. A correlation identifier for the change request is generated. The changes to the attributes are processed to update the directory object and the customized information is updated to an extension attribute for the directory object. A unique audit event is raised for each changed attribute including the extension attribute and each audit event includes the correlation identifier.

17 Claims, 4 Drawing Sheets

(56) References Cited

U.S. PATENT DOCUMENTS

| | | | | |
|---|---|---|---|---|
| 2002/0091975 | A1* | 7/2002 | Redlich | G06F 21/6218 |
| | | | | 714/699 |
| 2003/0131073 | A1* | 7/2003 | Lucovsky | H04L 67/303 |
| | | | | 709/219 |
| 2005/0071642 | A1* | 3/2005 | Moghe | H04L 63/1416 |
| | | | | 713/182 |
| 2006/0179037 | A1* | 8/2006 | Turner | G06F 16/10 |
| 2007/0055702 | A1* | 3/2007 | Fridella | G06F 16/122 |
| 2007/0150480 | A1* | 6/2007 | Hwang | G06Q 50/32 |
| 2008/0184058 | A1 | 7/2008 | McDermott et al. | |
| 2010/0058291 | A1* | 3/2010 | Hahn | G06F 8/70 |
| | | | | 717/113 |
| 2011/0208961 | A1* | 8/2011 | Bushman | G06Q 20/02 |
| | | | | 713/156 |
| 2012/0069131 | A1* | 3/2012 | Abelow | G06Q 10/067 |
| | | | | 348/14.01 |
| 2012/0226670 | A1* | 9/2012 | Arcushin | G06Q 10/20 |
| | | | | 707/692 |

OTHER PUBLICATIONS

"Active Directory Auditing Software", Netwrix.com, [Online]. Retrieved from the Internet: <URL: https://www.netwrix.com/active_directory_auditing.html>, (Accessed on Oct. 5, 2017), 7 pgs.

"Securing Privileged Access in Active Directory", Manage Engine Zoho Corp, [Online]. Retrieved from the Internet: <URL: https://www.manageengine.com/products/active-directory-audit/>, (Accessed on Oct. 5, 2017), 4 pgs.

Thompson, Troy, "Keeping an Eye on Your Network with Active Directory Auditing", Redmond Magazine, [Online]. Retrieved from the Internet: <URL: https://redmondmag.com/articles/2015/06/11/active-directory-auditing.aspx>, (Jun. 11, 2015), 3 pgs.

Wuchner, Brian, "Active Administrator", Quest.com, [Online]. Retrieved from the Internet: <URL: https://software.dell.com/landing/358/?gclid=CLj2-J7H2s4CFUJsfgod6y8ODw>, (Accessed on Oct. 5, 2017), 1 pg.

* cited by examiner

REAL-TIME MONITORING AND ALERTING FOR DIRECTORY OBJECT UPDATE PROCESSING

BACKGROUND

Existing techniques for updating directory-based objects include an intermediate directory service that handles updates to the object. When the updates are recorded in the directory database audit events are generated. The problem is that the audit information is at a coarse-grain level of detail, such that the original user that requested the updates and the device of that user are not recorded in the generated audit events. Rather, the audit events include an identifier for the intermediate directory service.

As a result, the true user that initiated the updates cannot be determined through the audit events. This lack of fine-grain information about directory object updates can pose security risks for an enterprise's networked environment and/or puts the enterprise at risk of failing compliance audits.

SUMMARY

Various embodiments of the invention provide methods and a system for real-time monitoring and alerting for directory object update processing. In an embodiment, a method for directory object update processing is presented.

Specifically, in an embodiment, information is collected for an initiator of a change request made to update attributes of an object. A correlation identifier is generated for the change request. The information is updated to an extension attribute of the object and the attributes of the object are updated with values provided for the attributes in the change request. An audit event is produced for each updated attribute of the object including the extension attribute, each audit event includes the correlation identifier.

DETAILED DESCRIPTION

A "resource" includes: a user, service, an application, system (groupings of applications, services, and/or hardware devices/virtual devices), a hardware device, a virtual device, directory, data store, a set of devices logically associated with a single processing environment, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, Media Access Control (MAC) address, Internet Protocol (IP) address, device serial number, etc.

A "credential" is a secret term, phrase, encrypted data, and/or key used for authenticating a principal to a resource (such as a processing environment). Authentication resolves to an identity for the principal, which is assigned access rights and/or access policies that are linked to that identity during interactions between the principal and the resource.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment. Moreover, a processing environment can be layered on top of a hardware set of resources (hardware processors, storage, memory, etc.) as a Virtual Machine (VM) or a virtual processing environment.

In an embodiment, a processing environment includes a container. A container does not have to have its own operating system (OS) as does a VM and can provide a logical processing environment utilizing the underlying OS and hardware on the device processing the container.

The phrases "processing environment," "cloud processing environment," "hardware processing environment," and the terms "cloud," "container," and "VM" may be used interchangeably and synonymously herein.

Moreover, it is noted that a "cloud" or a "container" refers to a logical and/or physical processing environment as discussed above.

A "service" (a type of resource as discussed above) as used herein is an application or software module that is implemented in a non-transitory computer-readable storage medium or in hardware memory as executable instructions that are executed by one or more hardware processors within one or more different processing environments. The executable instructions are programmed in memory when executed by the hardware processors. A "service" can also be a collection of cooperating services, such collection referred to as a "system."

A single service can execute as multiple different instances of a same service over a network.

An "object" is a collection of: software, functions, and data structures that logically represents a resource.

An "attribute" is a property (value) that is set on an object.

Various embodiments of this invention can be implemented as enhancements within existing network architectures and network-enabled devices.

Also, any software presented herein is implemented in (and reside within) hardware machines, such as hardware processor(s) or hardware processor-enabled devices (having hardware processors). These machines are configured and programmed to specifically perform the processing of the methods and system presented herein. Moreover, the methods and system are implemented and reside within a non-transitory computer-readable storage media or memory as executable instructions that are processed on the machines (underlying hardware processors) configured to perform the methods.

Of course, the embodiments of the invention can be implemented in a variety of architectural platforms, devices, OSs, file systems, directory services, server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1-4.

Figure 1:
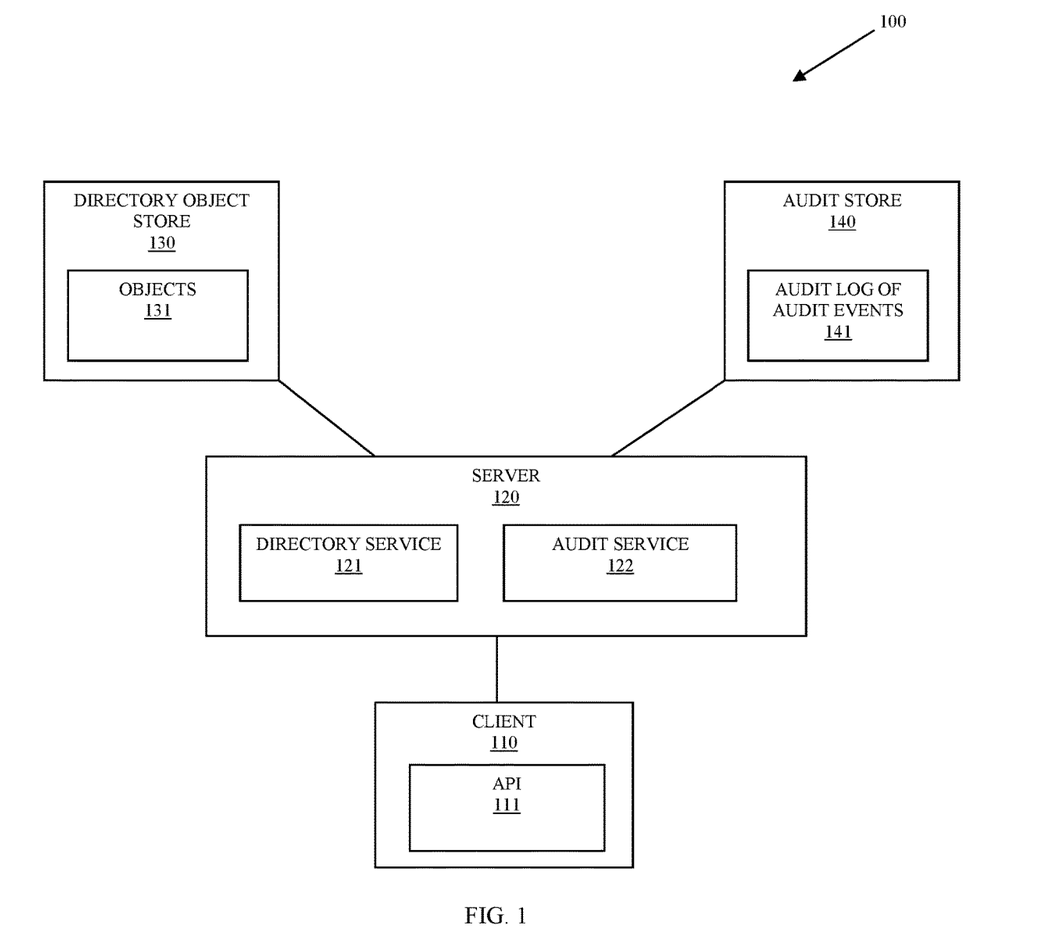
FIG. 1 is a diagram depicting a system for real-time monitoring and alerting for directory object update processing, according an example embodiment.

FIG. 1 is a diagram depicting a system for real-time monitoring and alerting for directory object update processing, according an example embodiment. It is noted that the system 100 is presented as an illustrated embodiment and that other component definitions are envisioned without departing from the embodiments discussed herein. It is also to be noted that only those components necessary for comprehending the embodiments are presented, such that more or less components may be used without departing from the teachings presented herein.

The system 100 includes: a client 110 having an Application Programming Interface (API) 111, a server 120 having a directory service 121 and an audit service 122, a directory object store including objects with attributes 131, and an audit store 140 including an audit log of audit events 141 (hereinafter just "audit log 141").

For the teachings presented herein and below, an existing attribute field or a new extended attribute field is utilized for each object identified in the directory object store 130.

The client 110 is operated by a principal (such as a user or an automatically initiated program on the client 110) for accessing objects 131 of the object store 130 through the API 111. The API 111 interacts directly with the directory service 121 of the server 120 and the directory service 121 manages the objects 131 identified in the object store 130.

When a principal initiates a change request on one or multiple attributes of an object 131, the API 111 and/or the directory service 121 collects additional data about the change request, which has heretofore not been provided in existing industry approaches associated with enterprise object management.

In an embodiment, this additional information includes one or more of: a principal identifier for the principal and/or a client identifier for the client 110.

In an embodiment, this additional information is any custom and predefined string of information for which the API 11 and/or directory service 121 is configured to obtain with the principal-initiated change request. In an embodiment, the content to acquire and the format of the additional information is defined in eXtensible Markup Language (XML) encoding.

The API 111 and/or directory service 121 automatically generates an additional update for the change request that was not requested by and that is unknown/transparent to the principal. This additional update is to include the additional information as an additional update to a predefined attribute of the object, such as an unused and available extension attribute field for the object 131. Again, the principal does not request and is unaware of the additional update for the predefined attribute of the object.

The directory service 121 formulates each individual change made to each specific attribute of the object 131 as a payload for committing as multiple attribute updates to the object store 130 in a single update operation. The payload includes the additional information gathered about the initiating principal for the change request.

For example consider a principal that is a user, Joe (principal), who has administrative access rights to make changes to an object 131 associated with a different user, Paul. In this example, Joe (using client 110 and API 111) makes a change request to change two attributes identified as description, location on Paul's user-object 131 in the object store 130. The payload submitted by the API against Paul's user object 131 may appear as follows:

{description="changedDescription",location="Houston", extension-attribute="Joe,client-id"}.

Here, the payload represents pairs of information, with the first part of each pair of information representing an attribute field name/identifier (description, location, and extension-attribute) followed by an assignment operator ("=") followed by a value to set on the attribute (changedDescription, Houston, "Joe, client-id").

The directory service 121 and/or the audit service 122 generates a unique correlation identifier for the change request and the audit service 122 then generates an audit event for each individual changed attribute for storing in the log of events 141 of the audit store 140. The unique correlation identifier (correlation id) unique identifies and provides a linkage between each attribute that was updated on the object 131 from the change request (formulated into the payload for a single update to the object store 130). Each audit event includes the correlation id.

Continuing with the previous example for illustrating the separate audit events, the audit service 122 generates three audit events as follows:

{description=changedDescription,correlation-id=123456789}
{location=Houston,correlation-id=123456789}
{extension-attribute=Joe,client-id,correlation-id-123456789}

The last audit event for the extension attribute includes a unique identifier for Joe (the principal that made the initial change request) as well as a client id for the client 110 that Joe used for submitting the initial change request. This last audit event along with the correlation id for all three events permit real-time tracking, monitoring, auditing, and linking (through the correlation id) of the change request submitted by Joe on Paul's user object 131.

The audit events for the change request and the updates on the object may be processed downstream by a variety of applications configured to recognize the audit events when raised by the audit service 122. For example, when the audit events are placed in the audit store 140 a trigger is raised to report the events to a real-time dashboard or to specific applications. This can be done in a variety of configurable manners, such as through policy enforcement agents processing on the network that receive notifications for the events or are configured to monitor the audit log 140 for any updates made by the audit service 122. The policy enforcement agents can be configured to take automated actions based on the type of audit events and/or the content of the audit events. This is but one of many examples. For example, the policy enforcement agents enforce policy conditions against the audit events that include conditional actions for making real-time decisions as to whether alerts need to be raised to other users (e.g., administrators, management, etc.) or to automated applications for taking even more automated actions on the network.

The object changed, which generated the audit events, may include other attributes, such as a type of object (group, user, machine, financial, etc.), these other attributes can be retrieved by the policy enforcement agents from the object store 130 using the changed-object identifier and/or the principal's identifier. In this way, a variety of information can be processed in real time for determining the conditional elements of policies by the policy enforcement agents upon detection/notice of the audit events updated to the audit store 140. The attribute field identifier is also already present in the audit events for identifying the type of attribute that was changed. The correlation id allows the policy enforcement agents to determine if combinations of attribute types are permissible or should raise a warning for the change request that was processed. The extension attribute may also be processed to identify whether patterns from a same initiating machine and/or initiating principal can be associated with other network security issues (for example Joe is issuing an excessive number of changes or Joe's machine is associated with security breaches detected on the network). A subsequent network hack from Joe's machine followed the change request having the changes identified from audit event linked together by the correlation id.

Fine-grain and customizable information is automatically generated on change requests made against attributes of an object 131 managed in the object store 130 and added as an extension attribute to the object 131 that is being updated with the change request. This auto-generated information is stored in the extension attribute within the object store 130 for the changed object. A new auto-generated auto event is generated for the newly populated extension attribute and all updates to all attributes for any changed object for a single change request includes its own audit event, and each of those audit events include a unique correlation id for linking and associating all the changed attributes for a single change request with one another. This provides the processing foundation for configuring and improving network security monitoring and auditing in real-time by network services/systems, through the correlation id and the extension attribute (which can be used for identifying the initiating machine and/or initiating principal for any given change request).

In an embodiment, the directory service 121 and the audit service 122 are subsumed into a single service performing the processing discussed above. In an embodiment, the single service is provided as an enhancement to Windows® Active Directory®.

In an embodiment, the client 110 is one of: a laptop computer, a wearable processing device, a network-voice enabled appliance that is part of the Internet-of-Things (IoTs), a desktop computer, a server, a tablet computer, and a phone.

In an embodiment, the processing 121-122 is provided as a container.

In an embodiment, the processing 121-122 is provided as a VM.

In an embodiment, the processing 121-122 is provided as cloud-based services.

In an embodiment, the processing 121-122 is provided as a Software-as-a-Service (SaaS).

In an embodiment, the object store 130 is an enterprise network-security asset data store for managing software and hardware assets of the enterprise. In an embodiment, the object store 130 is accessed for network resource authentication and setting/determining network resource security access rights during authenticated sessions for the network resources with the enterprise's network.

These embodiments and other embodiments are now discussed with reference to the FIGS. 2-4.

Figure 2:
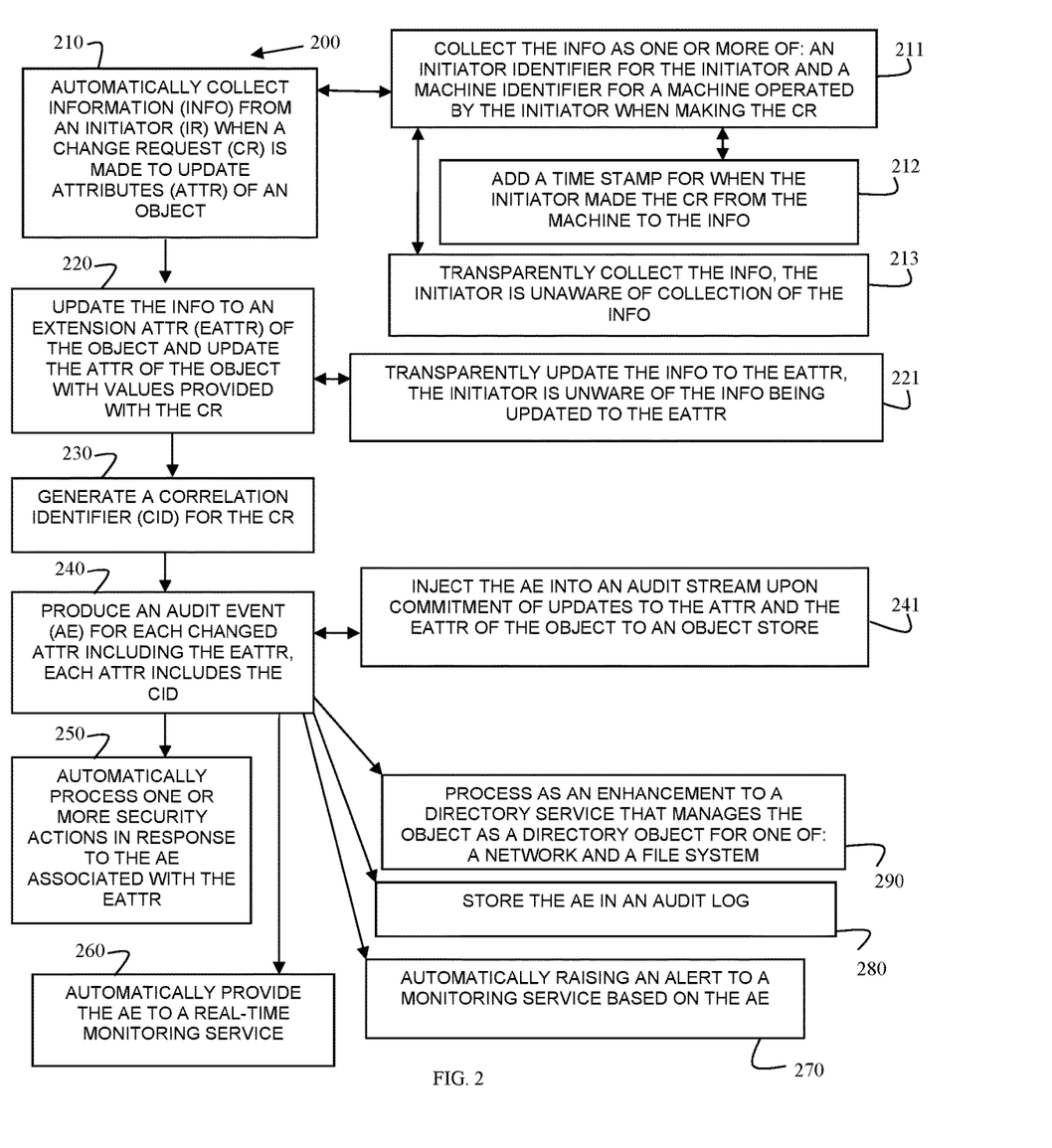
FIG. 2 is a diagram of a method for directory object update processing, according to an example embodiment.

FIG. 2 is a diagram of a method 200 for directory object update processing, according to an example embodiment. The method 200 is implemented as one or more software modules (herein after referred to as a "fine-grain audit controller"). The fine-grain audit controller is represented as executable instructions that are implemented, programmed, and reside within memory and/or a non-transitory machine-readable storage media; the executable instructions execute on one or more hardware processors of one or more network devices and have access to one or more network connections associated with one or more networks. The networks may be wired, wireless, or a combination of wired and wireless.

In an embodiment, fine-grain audit controller is all or some combination of: the directory service 121 and/or the audit service 122.

In an embodiment, the device that executes the fine-grain audit controller is server 120.

In an embodiment, the processing of the fine-grain audit controller is provided as a container.

In an embodiment, the fine-grain audit controller is provided as a cloud-based service.

In an embodiment, the fine-grain audit controller is provided within a VM of the server 120.

In an embodiment, the fine-grain audit controller is provided as a SaaS over a network connection.

At 210, the fine-grain audit controller automatically collects information from an initiator when a change request is made to update attributes of an object. The object can be any of the resources discussed above. The initiator is a principal, which can be a user or an automated application. The change request is made through an API, such as API 111. The change request is assumed to have the proper network security for performing the updates on the attributes for the target object. The attributes, as discussed above, a fields or properties assigned to the target object. The change request identifies the attributes being changed as well as the replacement values that are to be set on the object and updated for the object.

According to an embodiment, at 211, the fine-grain audit controller collects the information as one or more of: an initiator identifier (principal identifier) for the initiator (principal) and a machine identifier for a machine operated by the initiator when making the change request. In an embodiment, the initiator is a user and the initiator identifier is an object identifier for the user as stored in an object store. In an embodiment, the machine identifier is another object identifier for the machine. In an embodiment, the machine identifier is a Media Access Control (MAC) serial number for the machine. In an embodiment, the machine identifier is an Internet Protocol (IP) address assigned by an enterprise network to when the machine is connected to the enterprise network.

In an embodiment of 211 and at 212, the fine-grain audit controller adds a time stamp for when the initiator made the change request from the machine to the information that was automatically collected at 210.

In an embodiment of 211 and at 213, the fine-grain audit controller transparently collects the information. That is, the initiator is completely unaware of the collection of the information.

At 220, the fine-grain audit controller updates the information to an extension attribute of the object and the fine-grain audit controller also updates the attributes of the object with values provided with the change request by the initiator.

Again, and in an embodiment, at 221, the fine-grain audit controller transparently updates the information to the extension attribute, such that the initiator is completely unaware of the information being updated to the extension attribute. That is, the initiator did not provide an instruction for collecting the information at 210 or for updating the collected information to the extension attribute of the object. This processing is performed by the fine-grain audit controller.

At 230, the fine-grain audit controller generates a correlation identifier for the change request. As discussed above, the correlation identifier provides a linkage between independent and separate audit events for identifying all audit events associated with a single change request.

At 240, the fine-grain audit controller produces a separate and unique audit event for each changed attribute requested by the initiator in the change request and for the extension attribute. Each audit event includes the attribute field identifier, the value that was updated to that attribute field, and the correlation identifier.

In an embodiment, at 241, the fine-grain audit controller injects the audit events into a network audit stream upon commitments of updates to the attributes and the extension attribute of the object to an object store (processed for managing the object and other network objects as discussed above with the FIG. 1).

According to an embodiment, at 250, the fine-grain audit controller automatically processes one or more security actions in response to the audit event associated with the extension attribute. That is, the information and correlation identifier of the audit event for the extension attribute trigger the security actions to be automatically processed.

In an embodiment, at 260, the fine-grain audit controller automatically provides the audit events to a real-time monitoring/auditing service for real-time inspection and evaluation.

In an embodiment, at 270, the fine-grain audit controller automatically raises an alert to a monitoring service in real time based on inspecting and evaluating the audit events.

In an embodiment, at 280, the fine-grain audit controller stores the audit events in an audit log. In an embodiment, the storage of the audit events in the log triggers alerts or further real-time processing for security and/or auditing.

In an embodiment, at 290, the fine-grain audit controller is processed as an enhancement to a directory service that manages the object as a directory-based object for one or more of: a network and a file system. In an embodiment, the enhancement is provided within Window® Active Directory®. In an embodiment, the enhancement is provided within an LDAP directory service.

Figure 3:
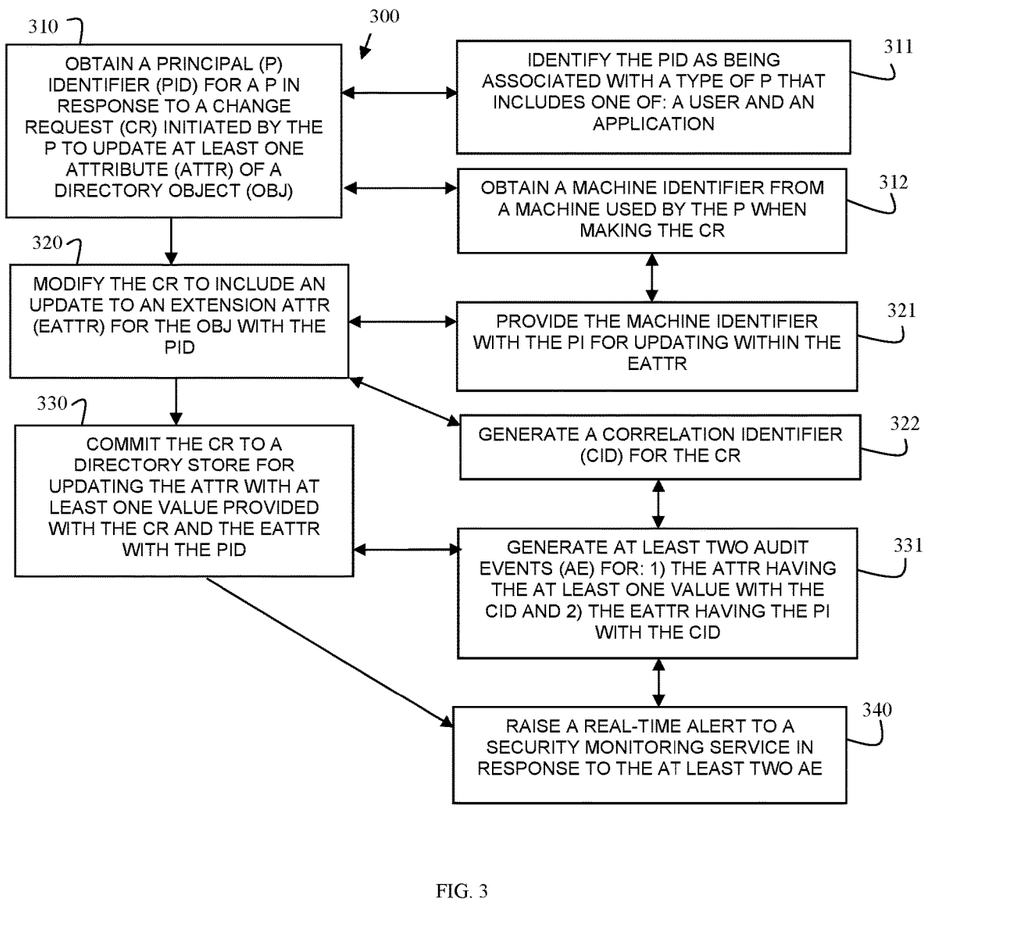
FIG. 3 is a diagram of another method for directory object update processing, according to an example embodiment.

FIG. 3 is a diagram of another method 300 for directory object update processing, according to an example embodiment. The method 300 is implemented as one or more software module(s) (herein after referred to as an "object update and audit service") on one or more hardware devices. The object update and audit service is represented as executable instructions that are implemented, programmed, and reside within memory and/or a non-transitory machine-readable storage medium; the executable instructions execute on one or more hardware processors of the one or more hardware devices and have access to one or more network connections associated with one or more networks. The networks may be wired, wireless, or a combination of wired and wireless.

In an embodiment, the object update and audit service is all or some combination of: the directory service 121, the audit service 122, and/or the method 200.

In an embodiment, the device that executes the object update and audit service is the server 120.

In an embodiment, the processing of the object update and audit service is provided as a container.

In an embodiment, the processing of the object update and audit service is provided as a cloud-based service.

In an embodiment, the processing of the object update and audit service is provided as a VM of the server 120.

In an embodiment, the processing of the object update and audit service is provided as a SaaS over a network connection.

The object update and audit service presents another and in some ways enhanced processing perspective for the method 200.

At 310, the object update and audit service obtains a principal identifier for a principal in response to a change request initiated by the principal to update at least one attribute of a directory object. Again, the principal uses an API (such as API 111) for formulating and communicating the change request to the object update and audit service. The object can be any managed network resource stored in a directory store (as discussed above).

According to an embodiment, at 311, the object update and audit service identifies the principal identifier as being associate with a type of principal that includes one of: a user and an automated application that is designed and permitted to submit automated change requests against the directory object store.

In an embodiment, at 312, the object update and audit service obtains a machine identifier from a machine used by the principal when making the change request. That is, the principal (whether a user or an automated application) is accessing the object update and audit service from a source device over a network connection for communicating the change request to the object update and audit service. The machine identifier is the identifier for that source device. This machine identifier can be a unique object identifier, a MAC serial number, and/or a network-assigned IP address to the machine.

At 320, the object update and audit service modifies the change request to include an update to an extension attribute for the object with the principal identifier. The original change request made by the principal did not include any reference to or values for updating the extension attribute of the object. This processing is performed automatically by the object update and audit service in response to receipt of a principal-provided change request.

In an embodiment of 312 and 320, at 321, the object update and audit service provides the machine identifier with the principal identifier for updating within the extension attribute of the object. Again, this is transparent processing and unknown to the principal making the change request.

In an embodiment, at 322, the object update and audit service generates a correlation identifier for the change request. This correlation identifier is for linking and associating each attribute that was updated with the change request together for audit event processing on the change request.

At 330, the object update and audit service commits the change request to a directory store for updating the at least one attribute with at least one value (which was provided by the principal in the change request) and updating the extension attribute of the object with the principal identifier.

According to an embodiment of 322 and 330, at 331, the object update and audit service generates at least two audit events for: 1) the attribute having the at least one value with the correlation identifier and 2) the extension attribute having the principal identifier with the correlation identifier. Each attribute being updated or set by the change request includes its own independent and separate audit event and each audit event includes the correlation identifier.

According to an embodiment of 331, at 340, the object update and audit service raises a real-time alert to at least one security monitoring service in response to the at least two audit events. In an embodiment, the object update and audit service translates the format of the audit events to a format that is recognized by the security monitoring service for automated processing by the security monitoring service.

Figure 4:
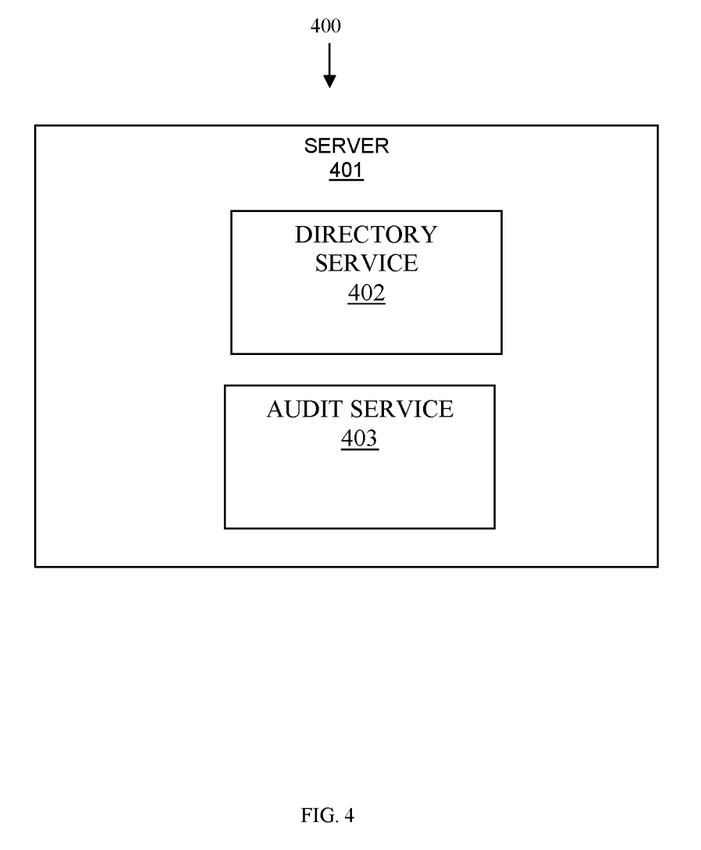
FIG. 4 is a diagram of another system for real-time monitoring and alerting for directory object update processing, according to an embodiment.

FIG. 4 is a diagram of another system 400 for real-time monitoring and alerting for directory object update processing, according to an embodiment. Various components of the system 400 are software module(s) represented as executable instructions, which are programmed and/or reside within memory and/or non-transitory computer-readable storage media for execution by one or more hardware devices. The components and the hardware devices have access to one or more network connections over one or more networks, which are wired, wireless, or a combination of wired and wireless.

In an embodiment, the system 400 implements, inter alia, the processing depicted in the FIGS. 1-3. Accordingly, embodiments discussed above with respect to the FIGS. 1-3, presented herein and above, are incorporated by reference herein with the discussion of the system 400.

The system 400 includes a server 401 having directory service 402 and an audit service 403.

In an embodiment, the directory service 402 and the audit service 403 are processed on the hardware processors of the server as one of: a container, a VM, a cloud-based service, and a SaaS.

In an embodiment, the directory service 402 and the audit service 403 are all or some combination of: the directory service 121, the audit service 122, the method 200, and/or the method 300.

In an embodiment, the directory service 402 and the audit service 403 cooperate as single software module that processes on the server 401. In an embodiment, the single software module is provided as an enhancement to Windows® Active Directory®.

The directory service 402 is configured to: 1) execute on at least one hardware processor of the server 401, 2) collect identifying information for a principal making a change request to at least one attribute of a directory object, 3) modify the change request to update the identifying information to an extension attribute of the directory object, 4) generate a correlation identifier for the change request, and 5) submit the change request to directory store for processing the change request.

The audit service 403 is configured to: 1) execute on at least one hardware processor of the server 401 and 2) inject at least two audit events into an audit processing stream of a network that includes: a) the at least one attribute, at least one value provided in the change request for the at least one attribute, and the correlation identifier, and b) the extension attribute, the identifying information, and the correlation identifier In an embodiment, the directory service 402 and the audit service 403 are integrated as enhancement processing into an existing directory service of the network. In an embodiment, the existing directory service is Windows® Active Directory®. In an embodiment, the existing directory service is a Lightweight Directory Access Protocol (LDAP) service.

In an embodiment, the directory store is the directory store 130. In an embodiment, the directory object is the directory object 131.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
automatically collecting information for an initiator when a change request is made to update attributes of an object;
generating a second change request to update an extension attribute on the object, wherein the second change request comprising the information, and wherein the initiator is unaware of the second change request;
formulating each individual change associated with each attribute being modified with the change request and the information associated with the extension attribute for the second change request as a payload associated with multiple attribute updates to the object in a single update based on the change request and the second change request;
processing the single update with the payload on the object by updating the information to the extension attribute of the object and updating the attributes of the object with values provided in the change request;
generating a unique correlation identifier for the change request;
producing an audit event for each changed attribute;
creating first audit entries, each first audit entry comprising a corresponding audit event and the unique correlation identifier;
creating a new audit event comprising the information and the unique correlation identifier;
creating a second audit entry comprising the new audit event; and
updating an audit store with the first audit entries and the second audit entry.

2. The method of claim 1, wherein collecting further includes collecting the information as one or more of: an initiator identifier for the initiator and a machine identifier for a machine operated by the initiator when making the change request.

3. The method of claim 2, wherein collecting further includes adding a time stamp for when the initiator made the change request from the machine to the information.

4. The method of claim 1, wherein processing further includes transparently updating the information to the extension attribute, wherein the initiator is unaware of the information being updated to the extension attribute.

5. The method of claim 1, wherein creating the new audit entry further includes injecting the first audit entries and the second audit entry into an audit stream upon commitment of updates to the attributes and the extension attribute of the object to an object store.

6. The method of claim 1 further comprising, automatically processing one or more security actions in response to the audit event associated with the extension attribute.

7. The method of claim 1 further comprising, automatically providing the audit events to a real-time monitoring service.

8. The method of claim 1 further comprising, automatically raising an alert to a monitoring service based on the audit events.

9. The method of claim 1 further comprising, storing the audit events in an audit log.

10. The method of claim 1 further comprising, processing the method as an enhancement to a directory service that manages the object as a directory object for a file system.

11. A method, comprising:
   obtaining a principal identifier for a principal in response to a change request initiated by the principal to update at least one attribute of a directory object;
   generating a second change request to update an extension attribute on the directory object, wherein the second change request comprising the principal identifier, and wherein the principal is unaware of the second change request;
   formulating each individual change associated with each at least one attribute being modified with the change request and the principal identifier associated with the extension attribute for the second change request as a payload associated with multiple attribute updates to the direct object in a single update based on the change request and the second change request;
   committing the single update to a directory store for updating the at least one attribute of the directory attribute with at least one value provided in the change request and for updating the extension attribute with the principal identifier;
   generating a unique correlation identifier for the change request;
   creating at least one audit event, each of the at least one audit events comprising a specific change value made with the change request to a corresponding one of the at least one attributes of the directory object;
   creating at least one first audit entry, each of the at least one first audit entries comprising a corresponding audit event and the unique correlation identifier;
   creating a new audit event comprising the principal identifier of the extension attribute from the object and the unique correlation identifier;
   creating a second audit entry comprising the new audit event; and
   updating an audit store with the at least one first audit entries and the second audit entry.

12. The method of claim 11, wherein obtaining further includes identifying the principal identifier as being associated with a type of principal that includes one of:
   a user and an application.

13. The method of claim 11, wherein obtaining further includes obtaining a machine identifier from a machine used by the principal when making the change request.

14. The method of claim 13, wherein formulating further includes providing the machine identifier with the principal identifier within the payload for the single update for updating within the extension attribute during the committing.

15. The method of claim 11 further comprising, associating the principal identifier with a security issue based on a total number of additional change requests associated with the principal identifier.

16. A system, comprising:
   a server comprising at least one hardware processor and a non-transitory computer-readable storage medium;
   the non-transitory computer-readable storage medium comprising executable instructions representing a directory service and an audit service;
   the directory service when executed by the at least one hardware processor from the non-transitory computer-readable storage medium causes the at least one hardware processor to perform operations comprising:
      collecting identifying information for a principal making a change request to at least one attribute of a directory object;
      generating a second change request to update an extension attribute on the directory object, wherein the second change request comprises the identifying information, and wherein the principal is unaware of the second change request;
      formulating each individual change associated with each at least one attribute being modified with the change request and the identifying identifier associated with the extension attribute for the second change request as a payload associated with multiple attribute updates to the direct object in a single update based on the change request and the second change request;
      generating a unique correlation identifier for the change request; and
      submitting the single update with the payload to a directory store for processing the change request and the second change request; and
   the audit service when executed by the at least one hardware processor from the non-transitory computer-readable storage medium causes the at least one hardware processor to perform second operations comprising:
      creating at least one audit event, each of the at least one audit events comprising a specific change value made with the change request to a corresponding one of the at least one attributes of the directory object;
      creating at least one first audit entry, each of the at least one first audit entries comprising a corresponding audit event and the unique correlation identifier;
      creating a new audit event comprising the identifying information of the extension attribute from the object and the unique correlation identifier;
      creating a second audit entry comprising the new audit event;
      updating an audit store with the at least one first audit entry and the second audit entry; and
      injecting the at least one audit event and the new audit event into an audit processing stream of a network.

17. The system of claim 16, wherein the directory service and the audit service are integrated as enhancement processing into an existing directory service of the network.

* * * * *

UNITED STATES PATENT AND TRADEMARK OFFICE
CERTIFICATE OF CORRECTION

PATENT NO. : 10,997,287 B2
APPLICATION NO. : 15/726212
DATED : May 4, 2021
INVENTOR(S) : Paul Robert Judson It is certified that error appears in the above-identified patent and that said Letters Patent is hereby corrected as shown below:

In the Claims

In Column 11, Line 23, in Claim 11, delete "direct" and insert --directory-- therefor In Column 12, Line 25, in Claim 16, delete "direct" and insert --directory-- therefor Signed and Sealed this
Fourth Day of January, 2022

Drew Hirshfeld
*Performing the Functions and Duties of the
Under Secretary of Commerce for Intellectual Property and
Director of the United States Patent and Trademark Office*